Figure 1:
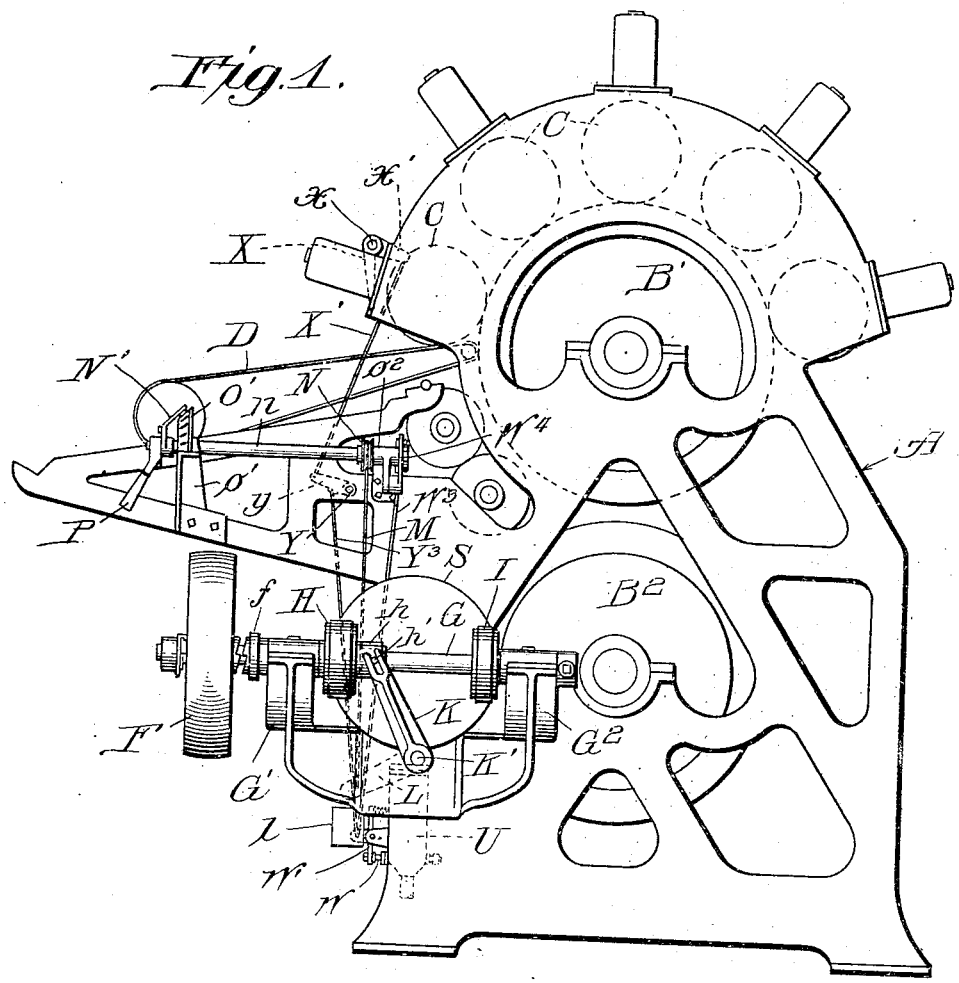

F. BALZER.
PNEUMATICALLY CONTROLLED FRICTION DRIVING MECHANISM FOR IRONING MACHINES.
APPLICATION FILED NOV. 1, 1913. RENEWED NOV. 22, 1917.

1,251,734.

Patented Jan. 1, 1918.
3 SHEETS—SHEET 1.

Witnesses:
Harry S. Gaither
Helen Freund

Inventor:
Fritz Balzer
by Sheridan, Wilkinson & Scott
Att'ys

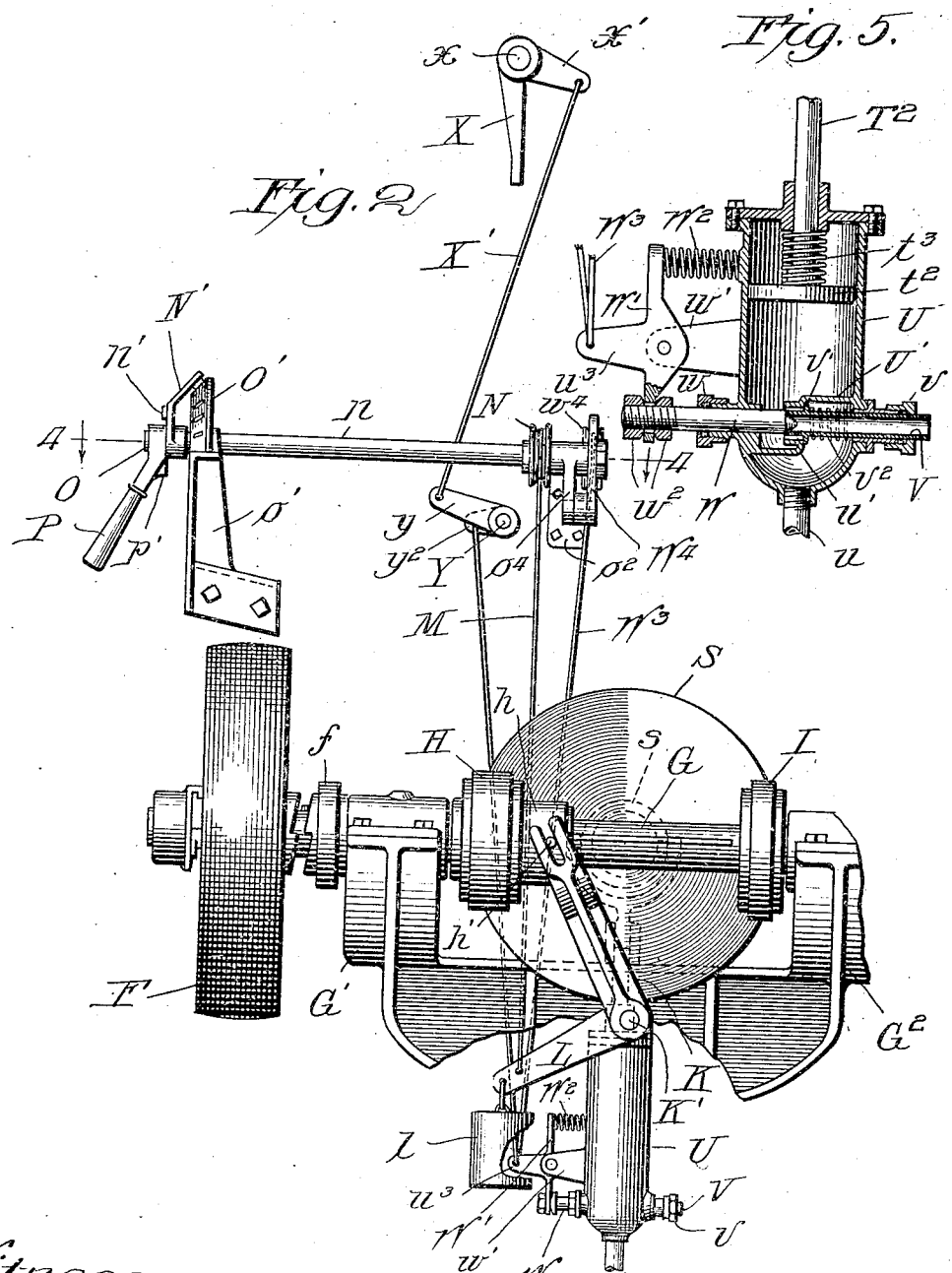

F. BALZER.
PNEUMATICALLY CONTROLLED FRICTION DRIVING MECHANISM FOR IRONING MACHINES.
APPLICATION FILED NOV. 1, 1913. RENEWED NOV. 22, 1917.
1,251,734.
Patented Jan. 1, 1918.
3 SHEETS—SHEET 3.
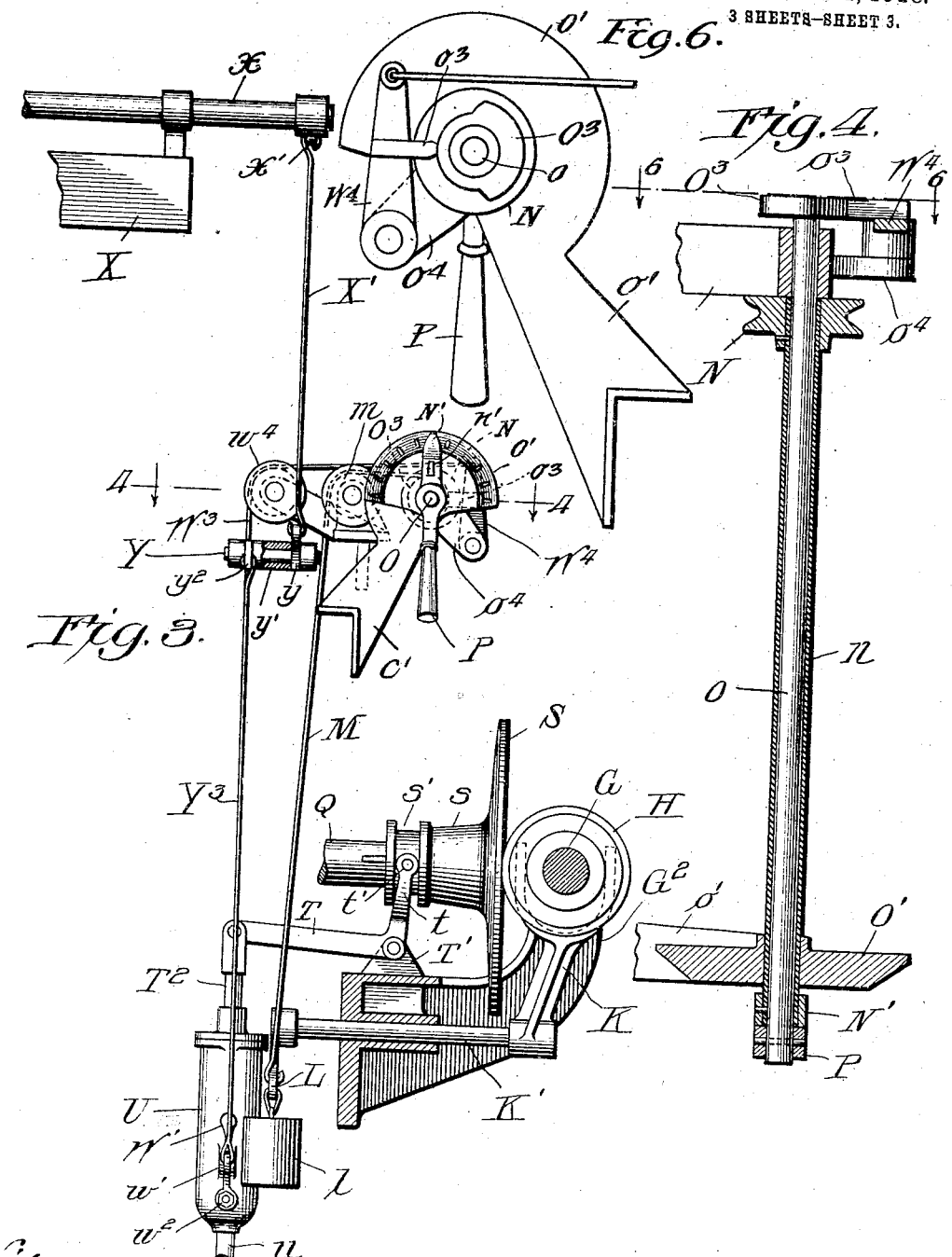

UNITED STATES PATENT OFFICE.

FRITZ BALZER, OF CHICAGO, ILLINOIS, ASSIGNOR TO TROY LAUNDRY MACHINERY COMPANY, LTD., OF CHICAGO, ILLINOIS, A CORPORATION OF NEW YORK.

PNEUMATICALLY-CONTROLLED FRICTION DRIVING MECHANISM FOR IRONING-MACHINES.

1,251,734.      Specification of Letters Patent.      Patented Jan. 1, 1918.

Application filed November 1, 1913, Serial No. 798,764. Renewed November 22, 1917. Serial No. 203,464.

*To all whom it may concern:*

Be it known that I, FRITZ BALZER, subject of the Emperor of Germany, residing at Chicago, in the county of Cook and State of Illinois, have invented certain new and useful Improvements in Pneumatically-Controlled Friction Driving Mechanism for Ironing-Machines, of which the following is a specification.

My invention relates in general to pneumatically controlled machinery and more particularly to mechanism for controlling the operation of ironing machines.

One of the objects of my invention is to provide a friction driving mechanism for cylinder ironing machines, and for other machines, in which the driven disk will be automatically moved out of contact with the driving pinion prior to and during the adjustment of the pinion radially with respect to the disk; and in which the disk will be automatically moved out of contact with the pinion to discontinue the operation of the machine should the operator be in danger of injury.

A further object of my invention is to provide pneumatically actuated mechanism for moving the driving and driven friction elements into and out of contact to start and stop the operation of the machine and to insure the disengagement of such elements prior to and during their relative radial adjustment in varying the speed of the driven element.

A further object of my invention is to provide pneumatically actuated mechanism for automatically discontinuing the operation of a machine should there arise danger of injury to the operator.

A still further object of my invention is to provide cylinder ironing machines, and other machines, with power transmission mechanism which will be simple in construction, efficient in operation, and durable in use.

My invention will be more fully disclosed hereinafter with reference to the accompanying drawings, in which the same is illustrated as embodied in a convenient and practical form, and in which—

Figure 1 is an end elevational view of my invention applied to a cylinder ironing machine, only so much of the latter being illustrated as is necessary to disclose the connection therewith of my invention;

Fig. 2 a view similar to Fig. 1, on an enlarged scale, showing my invention disconnected from the machine in connection with which it is used;

Fig. 3 a view similar to Fig. 2 looking from the left in Fig. 2;

Fig. 4 a sectional view on line 4, 4, Figs. 2 and 3;

Fig. 5 a vertical section, on an enlarged scale, through the center of the pneumatic cylinder, and Fig. 6 is a view taken on the line 6—6 of Fig. 4 showing the cam employed for operating one of the valve levers.

Similar reference characters are used to designate similar parts in the several figures of the drawings.

Reference character A indicates one of the side supporting frames of a cylinder ironing machine. B', B² indicates steam heated cylinders, and reference character C rollers which coöperate with the cylinder B'. D designates the feed apron upon which the articles are placed and by which they are carried between the first roller C and the cylinder B'. Inasmuch as my invention is not restricted in its use to a cylinder ironing machine of the type partially illustrated in Fig. 1, it is not necessary to a full understanding of my invention that such machine should be illustrated and described in detail. It will be understood that my invention is not restricted in its use to ironing machines of any particular construction, nor in fact to ironing machines, but is capable of use in connection with other machines.

F designates a pulley to which a driving belt, leading from any source of power, is adapted to be applied. G designates a shaft, upon the outer end of which the belt pulley F is loosely mounted, and which is suitably journaled upon the frame of the machine, as by means of brackets G' and G² supported by the side frame A of the machine. *f* designates a clutch feathered upon the shaft G and adapted to be moved into and out of a coöperating clutch member on the belt pulley F in order to non-rotatively lock the pulley to the shaft and thereby drive the latter.

Feathered upon the shaft G is a friction pinion H. I designates an idler friction pinion loosely, but axially immovable, supported on the shaft G. K designates a lever having a yoke which straddles a ring $h$ rotatably mounted on the hub of the pinion H. The ends of the yoke are slotted and engage pins $h'$ projecting radially from the opposite sides of the ring $h$. The lever K is fixed to a rock shaft K' suitably journaled upon the frame of the machine, as shown in Fig. 3. The opposite end of the rock shaft K', to that on which the lever K is fixed, is provided with a crank arm L, from the free end of which a weight $l$ depends. A flexible connection M extends from the free end of the crank L and passes over a guide roller $m$ to a sheave N fixed upon a sleeve $n$ loosely supported upon a shaft O. One end of the shaft O is journaled in a bracket $o^2$ fixed to the side frame A of the machine, while a bracket $o'$ is also supported on the frame of the machine through which the sleeve $n$ rotatably extends, as clearly shown in Fig. 4. The end of the sleeve $n$, which projects beyond its bearing in the bracket $o'$, has fixed thereto a pointer N' extending adjacent the graduations on a semi-circular dial O' supported by the bracket $o'$. The end of the shaft O, which projects beyond the end of the sleeve $n$ on which the pointer N' is located, has fixed thereto a handle P provided with a lug $p'$ adapted to engage a lug $n'$ on the pointer N' when the hand lever and shaft are rotated relatively to the pointer and sleeve connected therewith.

Q designates a shaft suitably journaled upon the machine for operating the same through the medium of suitable gearing which is not shown, as it is unessential to a complete disclosure of my invention. Feathered upon the end of the shaft Q is the hub $s$ of a friction disk S. The hub $s$ is provided with a circular groove $s'$, into which extend pins $t'$ carried by the ends of a yoke $t$ formed on a bell crank lever T, the latter being suitably fulcrumed upon a bracket T'. The opposite end of the bell crank lever T, from that on which the yoke $t$ is formed, is pivotally connected to the end of a piston-rod $T^2$, which extends through the head of a cylinder U and is connected with a piston $t^2$ mounted to reciprocate in such cylinder. A spring $t^3$ surrounds the portion of the piston-rod $T^2$ within the cylinder and is interposed between the cylinder head and piston so as to exert a pressure tending to move the piston within the cylinder in a direction to oscillate the bell crank lever T.

The end of the cylinder U opposite to that through which the piston-rod $T^2$ extends is provided with an inlet conduit $u$ leading from a source of fluid pressure. A partition U' extends across the cylinder U intermediate of the supply conduit $u$ and the piston $t^2$. The partition is provided with an opening $u'$ in a plane extending longitudinally of the cylinder. An axially movable tube V extends through a suitable packing box $v$ into the cylinder U and is provided with a collar $v'$, which overlies the seat formed around the opening $u'$ in the partition U'. A spring $v^2$ surrounds the tube V and is interposed between the cylinder and collar $v'$ around the tube, the tension of such spring serving to normally retain such collar in contact with the seat around the opening in the partition so as to disconnect the supply conduit $u$ from the piston $t^2$. A reciprocating rod W extends through a suitable packing box $w$ in the cylinder U, and is provided with an end adapted to engage the open inner end of the tube V. A bell crank lever W' is fulcrumed upon a bracket $w'$ on the exterior of the cylinder U, and is connected to the rod W, in any suitable manner, as by means of clamp nuts $w^2$ between which the end of the bell crank lever is interposed. A spring $W^2$ is interposed between the bell crank lever and the cylinder, the tension of which tends to so oscillate the bell crank lever as to force the rod W inwardly and thereby force the tube V outwardly so as to unseat the collar $v'$ and permit fluid pressure to pass through the partition U' into contact with the piston $u^2$.

A flexible connection $W^3$ extends from the projection $u^3$ on the bell crank lever over a guide pulley $w^4$ to a link $W^4$ which is fulcrumed upon a bracket $o^4$ supported in a convenient manner, as for instance, from the bracket $o^2$. An eccentric $O^3$ is fixed upon the end of the shaft O, which projects beyond its bearing in the bracket $o^2$, such cam engaging a lug $o^3$ projecting from the link $W^4$, which is fulcrumed upon the bracket $o^4$ and at its free end $x$ $x$ is connected to the flexible connection $W^3$.

X designates a safety guard, which is mounted upon the machine adjacent the plane where the articles are fed between the ironing rollers, the position of this guard being such that should the hands of the operator approach too close to the rolls the guard will be oscillated and thereby, through suitable connections, stop the operation of the machine and prevent the hands of the operator being drawn between the rolls. The mechanism which is actuated by the safety guard X to discontinue the operation of the machine comprises the crank arm $x'$ fixed to the oscillatory rod, from which the guard depends, such crank arm being connected by a flexible connection X' with a crank arm $y$ fixed to a rock shaft Y. The rock shaft is supported in a suitable bearing $y'$ mounted upon the frame of the machine. A crank arm $y^2$ projects from the rock shaft Y and is united by a flexible connection Y³ with the projection $u^3$ on the bell crank lever W'.

The manner of using and operation of my invention are as follows: The movable member of the clutch $f$ is adjusted on the shaft G so as to engage the member on the pulley F and thereby non-rotatably connect the pulley with the shaft, so that the shaft is rotated. The rotation of the shaft G revolves the friction driving pinion H thereon, which in turn rotates the friction disk S and with it the shaft Q. As the shaft Q is operatively connected to the rotating parts of the machine, it is obvious that the machine will be driven through the medium of the engagement of the friction pinion H with the friction disk S. The frictional contact of the pinion with the disk is normally maintained by reason of the spring W² oscillating the bell crank lever W' in a direction to move inwardly the rod W against the tube V and force the latter outwardly so as to open the passageway through the partition U' for the flow of fluid pressure against the piston $t^2$. The piston $t^2$ is consequently maintained in its upward position with the spring $t^3$ compressed, so as to yieldingly retain the bell crank lever T in position to hold the disk S against the periphery of the pinion H.

When it is desired to vary the speed at which the machine is operated, the hand lever P is oscillated toward the left in Fig. 3, which oscillates the eccentric O³ thereon, so that the greater diameter of the eccentric engages the lug $o^3$ on the link W⁴, and oscillates the latter toward the right. Such oscillation of the link W⁴ pulls upwardly on the flexible connection W³ and oscillates the bell crank lever W' in a direction to compress the spring W² and move outwardly the rod W, so that its inner end is disengaged from the inner end of the tube V and the latter forced by the spring $v^2$ toward the left (see Fig. 5) until the collar $v'$ thereof seats against the adjacent seat formed around the opening in the partition U'. The fluid pressure conduit $u$ is consequently disconnected from the space in the cylinder between the partition and piston, while at the same time the fluid pressure in such space exhausts through the tube V to the atmosphere. The tension of the spring $t^3$ moves the piston $t^2$ within the cylinder U, thereby rocking the bell crank lever T in a direction to move the disk S away from the pinion H. A further movement of the lever P toward the left in Fig. 3 causes the lug $p'$ thereon to engage the lug $n'$ on the pointer N, thereby oscillating the sleeve $n$ in a direction to wind the flexible connection M on the sleeve $n$. Such movement of the flexible connection M oscillates the bell crank lever L, and moves the pinion H upon the shaft G radially with respect to the disk S. The extent of radial movement of the pinion relatively to the disk is indicated by the movement of the pointer N relatively to the graduations on the dial O'. The pinion H is retained in its adjusted position against the tendency of the weight $l$ to move the same outwardly, with respect to the center of the disk S, by means of a projection on the pointer N which successively seats within recesses in the dial O'. Inasmuch, however, as the pinion H must never occupy a position at the center of the disk S, there is no recess formed in the dial O' at a point which would stop the movement of the pointer at such a position that the pinion would be located in alinement with the center of the disk.

During the oscillation of the pointer N' to the proper position relatively to the dial, in order that the desired speed may be transmitted to the machine, the eccentric O³ holds the link W⁴ in such a position that the cylinder U is open to the atmosphere, and hence the disk S is continued out of contact with the pinion H during the adjustment of the latter radially with respect to the disk. After the radial adjustment of the pinion to the desired position, the hand lever P is so oscillated as to present the shorter diameter of the eccentric O³ to the link W⁴, which slackens the tension on the connection W³ and permits the spring W² to oscillate the bell crank lever W' and move the rod W toward the light from the position shown in Fig. 5, thereby opening the passageway from the fluid pressure supply conduit U into the cylinder, so that the piston is moved against the tension of the spring $t^3$ and the bell crank lever T oscillated in a direction to force the disk S against the periphery of the pinion H.

Should the hand of an operator come in contact with the safety guard, it will be oscillated and thereby oscillate the shaft, to which it is fixed and rock the arm $x'$ upwardly so that a pull is exerted on the connection X', which in turn oscillates the crank shaft Y so that a pull is exerted upon the connection Y³ leading from the crank $y^2$ to the bell crank lever W'. The bell crank lever is thereby oscillated against the tension of the spring W² and the rod W moved toward the left from the position shown in Fig. 5 so that the pressure will be exhausted from the cylinder $u$ and permit the spring $t^3$ to move the piston in a direction to oscillate the bell crank lever $t$ and move the disk S out of contact with the driving pinion H. The operation of the machine is thereby at once stopped and injury to the operator avoided. When the pressure upon the safety guard is discontinued the spring W² at once acts to move the rod W inwardly against the inner end of the tube V, thereby cutting off the exhaust from the cylinder, and also moving such tube away from the seat in the partition U' so as to permit fluid pressure to pass into the cylinder and again move the piston $t^2$ in a direction to engage the disk S with the driving pinion H.

From the foregoing description it will be observed that I have invented an improved friction driving mechanism for cylinder ironing machines, and other machines, in which the driving and driven friction elements are separated prior to the relative radial adjustment of the elements, and in which the engaged friction elements will be automatically separated and the operation of the machine discontinued when further operation of the machine would be likely to injure the operator. It will be further observed that I have invented an improved power transmission mechanism for cylinder ironing machines, and other machines, controlled by pneumatically actuated mechanism so that any exhaust of fluid pressure from the motor cylinder will immediately effect the separation of the coöperating driving and driven elements and discontinue the operation of the machine.

I claim:

1. The combination with a machine comprising rotating parts, of friction power transmission mechanism comprising driving and driven elements, pneumatically actuated means for moving said elements into and out of frictional engagement, means for moving one of said elements radially with respect to the other, and interlocking mechanism for preventing the operation of said latter means until after said first means have operated to separate said elements.

2. The combination with a machine comprising rotating parts, of friction power transmission mechanism comprising driving and driven elements, pneumatically controlled means for moving said elements into and out of frictional engagement, means for adjusting one of said elements radially with respect to the other, and means for effecting the operation of the pneumatically controlled means to disengage the elements prior to and during the relative radial adjustment of said elements.

3. The combination with a machine comprising rotating parts, of friction power transmission mechanism comprising driving and driven elements, means for relatively radially moving said elements, means for moving said elements into and out of frictonal contact, and a coöperating mechanism for requiring the actuation of said second means to separate the elements prior to and during the actuation of said first means.

4. The combination with a machine comprising rotating parts, of friction power transmission mechanism comprising driving and driven elements, fluid pressure operated mechanism for relatively moving said elements into and retaining them in frictional contact, means for separating said elements upon the release of fluid pressure from said mechanism, means for moving one of said elements radially with respect to the other, and interlocking mechanism for preventing the operation of said latter means until said means have operated to separate said elements.

5. The combination with a machine comprising rotating parts, of friction power transmission mechanism comprising driving and driven elements, fluid pressure operated mechanism for relatively moving said elements into and retaining them in frictional contact, means for relatively radially adjusting said elements, and a coöperating mechanism for releasing fluid pressure from said mechanism prior to and during the relative radial movement of the elements.

6. The combination with a machine comprising rotating parts, of friction power transmission mechanism comprising driving and driven elements, means for relatively moving said elements into and out of engagement, a cylinder, a piston therein operatively connected to said means, valve mechanism controlling the supply and exhaust of fluid pressure to and from said cylinder, means for relatively radially adjusting said elements, and an operating device connected with said valve mechanism and with said last-named means for operating said valve mechanism to effect the separation of said elements prior to and during the operation of said means.

7. The combination with a machine comprising rotating parts, of a driving shaft, a friction pinion axially movable on said shaft, a driven shaft operatively connected with the rotating parts of the machine and extending at right-angles to the driving shaft, a friction disk axially movable on said driven shaft, a fluid pressure cylinder, a piston therein operatively connected with said disk for retaining the same in contact with said pinion, means for automatically disengaging said disk from said pinion upon the release of fluid pressure from said cylinder, valve mechanism for controlling the supply and exhaust of fluid pressure to and from said cylinder, means for normally retaining said valve mechanism in position to supply fluid pressure to said cylinder, and means for operating said valve mechanism to exhaust fluid pressure from said cylinder.

8. The combination with a machine comprising rotating parts, of a driving shaft, a friction pinion axially movable on said shaft, a driven shaft operatively connected with the rotating parts of the machine and extending at right-angles to the driving shaft, a friction disk axially movable on said driven shaft, a fluid pressure cylinder having a piston therein operatively connected with said disk for retaining the same in contact with said pinion, means for automtically disengaging said disk from said pinion upon the release of fluid pressure from said cylinder, valve mechanism for controlling the supply and exhaust of fluid pressure to and from said cylinder, means for normally retaining said valve mechanism in position to supply fluid pressure to said cylinder, means for moving said pinion axially on said driving shaft, and interlocking connections between said valve operating means and said pinion adjusting means for effecting the release of fluid pressure from said cylinder prior to and during the operation of said pinion adjusting means.

9. The combination with a machine comprising rotating parts, of power-transmitting elements, means for relatively radially moving said elements, means for moving said elements into and out of frictional contact, and coöperating mechanism for requiring the operation of said second means to separate the elements prior to and during the actuation of said first means.

In testimony whereof, I have subscribed my name.

FRITZ BALZER.

Witnesses:
 GEO. L. WILKINSON,
 HENRY A. PARKS.

Copies of this patent may be obtained for five cents each, by addressing the "Commissioner of Patents, Washington, D. C."